United States Patent
Cen et al.

(10) Patent No.: US 10,192,054 B2
(45) Date of Patent: Jan. 29, 2019

(54) AUTOMATIC PAIRING OF IO DEVICES WITH HARDWARE SECURE ELEMENTS

(71) Applicant: Intel Corporation, Santa Clara, CA (US)

(72) Inventors: Shanwei Cen, Portland, OR (US); Kirk D. Brannock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1271 days.

(21) Appl. No.: 14/026,372

(22) Filed: Sep. 13, 2013

(65) Prior Publication Data

US 2015/0081257 A1   Mar. 19, 2015

(51) Int. Cl.
*G06F 21/57*     (2013.01)
*G06F 21/82*     (2013.01)

(52) U.S. Cl.
CPC ............ *G06F 21/575* (2013.01); *G06F 21/82* (2013.01)

(58) Field of Classification Search
CPC .................................... G06F 21/575
USPC ............................................. 703/2
See application file for complete search history.

(56) References Cited

U.S. PATENT DOCUMENTS

| | | | |
|---|---|---|---|
| 6,357,008 B1 * | 3/2002 | Nachenberg | G06F 21/566 714/38.13 |
| 6,711,675 B1 * | 3/2004 | Spiegel | G06F 9/4401 713/164 |
| 7,536,722 B1 * | 5/2009 | Saltz | G06F 21/33 726/20 |
| 7,770,205 B2 * | 8/2010 | Frank | G06F 21/10 726/2 |
| 7,844,809 B2 * | 11/2010 | Brannock | G06F 21/572 710/260 |
| 8,201,239 B2 * | 6/2012 | Smith | G06F 21/575 713/189 |
| 8,468,330 B1 * | 6/2013 | Reed | G06F 21/51 713/164 |
| 8,667,607 B2 * | 3/2014 | Paczkowski | G06F 21/74 711/100 |
| 9,158,896 B2 * | 10/2015 | Cox | G06F 21/10 |
| 9,251,384 B1 * | 2/2016 | Potlapally | G06F 21/85 |
| 9,262,637 B2 * | 2/2016 | Jacobs | G06F 21/57 |

(Continued)

FOREIGN PATENT DOCUMENTS

| | | |
|---|---|---|
| CN | 102422598 A | 4/2012 |
| WO | 2013022655 A1 | 2/2013 |

OTHER PUBLICATIONS

ARM_2009, Arm Security Technology, Building a Secure System using TrustZone Technology, PRD29-GENC-009492C.*

(Continued)

*Primary Examiner* — Brian S Cook
(74) *Attorney, Agent, or Firm* — Jordan IP Law, LLC

(57) ABSTRACT

Methods and systems may provide for receiving at a secure element of a system, during a boot process of the system, a first pairing authentication value from a pairing agent. In addition, a pairing key may be received from the pairing agent, wherein the first pairing authentication value and the pairing key may be used to establish a trusted channel between the secure element and an input output (IO) device coupled to the system. In one example, the first pairing authentication value is accepted only if the first pairing authentication value is received prior to a predetermined stage of the boot process.

24 Claims, 2 Drawing Sheets

(56) References Cited

U.S. PATENT DOCUMENTS

| | | | | |
|---|---|---|---|---|
| 9,294,287 | B2* | 3/2016 | Lambert | H04L 9/3271 |
| 9,471,811 | B2* | 10/2016 | Kobres | G06F 21/82 |
| 2004/0088531 | A1 | 5/2004 | Rothman | |
| 2005/0283826 | A1 | 12/2005 | Tahan | |
| 2006/0059572 | A1* | 3/2006 | Shoemaker | G06F 21/10 |
| | | | | 726/29 |
| 2006/0210082 | A1* | 9/2006 | Devadas | G06F 21/31 |
| | | | | 380/277 |
| 2007/0061566 | A1* | 3/2007 | Bailey | H04L 9/0866 |
| | | | | 713/151 |
| 2008/0120499 | A1 | 5/2008 | Zimmer et al. | |
| 2010/0235487 | A1 | 9/2010 | Guthery | |
| 2011/0246756 | A1* | 10/2011 | Smith | H04L 9/3252 |
| | | | | 713/2 |
| 2011/0296409 | A1* | 12/2011 | Lo | G06F 8/71 |
| | | | | 718/1 |
| 2011/0314288 | A1* | 12/2011 | Yogev | G06F 21/31 |
| | | | | 713/172 |
| 2012/0161924 | A1* | 6/2012 | Lin | H04W 12/06 |
| | | | | 340/5.8 |
| 2013/0031374 | A1* | 1/2013 | Thom | G06F 21/57 |
| | | | | 713/189 |
| 2013/0031541 | A1 | 1/2013 | Wilks et al. | |
| 2013/0067534 | A1* | 3/2013 | Soffer | G06F 3/0227 |
| | | | | 726/2 |
| 2013/0318358 | A1* | 11/2013 | Wang | G06F 21/31 |
| | | | | 713/182 |
| 2014/0181925 | A1* | 6/2014 | Smith | G06F 21/45 |
| | | | | 726/6 |
| 2016/0342559 | A1* | 11/2016 | Hulbert | G06F 3/0219 |

OTHER PUBLICATIONS

SMM_Defined Archieved Feb. 27, 2013 system management mode and SMI defined downloaded from https://en.wikipedia.org/w/index.php?title=System_Management_Mode&oldid=540807551.*

Trusted_Execution_Technology_DEFINED_Jul. 2013 archived Jul. 13, 2013 from https://en.wikipedia.org/w/index.php?title=Trusted_Execution_Technology&oldid=564126.*

SHA-1_DEFINED_Aug. 2013 archived Aug. 24, 2013 from https://en.wikipedia.org/w/index.php?title=SHA-1&oldid=569998109.*

Poll_2013 (van Rijswijk-Deij, R., and Poll, E. Using trusted execution environment in two-factor authentication: comparing approaches. In Open Identity Summit (2013), OID'13. (Sep. 10, 2013).).*

Lai_March_2013 AMD Security and Server Innovation, UEFI PlugFest—Mar. 18-22, 2013 Roger Lai, AMD TATS BIOS Development Group.*

Infinitive Marker Defined, Oxford Learners Dictionary, Oxford University Press.*

Rana_Activation_Spoofed (Windows 7 Activation Spoofed (not cracked) via SLIC 2.1 and OEM Master Key, Downloaded from http://blog.hishamarana.com/2009/07/30).*

Parno 2011 (Bootstrapping Trust in Modern Computers, Springer 2011).*

TPM 2009 (ISO/IEC 11889-1, First Edition May 15, 2009).*

Raihi_2005 (Network Working Group Request for Comments: 4226, HOTP: An HMAC-Based One-Time Password Algorithm, Dec. 2005).*

SMM_2003 (System Management Mode, Intel Enterprise Platforms & Service Division, 2003).*

International Search Report and Written Opinion for International Application No. PCT/US2014/054523, dated Dec. 5, 2014, 11 pages.

International Preliminary Report on Patentability for International Application No. PCT/US2014/054523, dated Mar. 26, 2016, 8 pages.

European Search Report for EP Patent Application No. 14843785.8, dated Apr. 3, 2017, 7 pages.

* cited by examiner

AUTOMATIC PAIRING OF IO DEVICES WITH HARDWARE SECURE ELEMENTS

BACKGROUND

Technical Field

Embodiments generally relate to security in computing platforms and/or systems. More particularly, embodiments relate to the automatic pairing of input output (IO) devices with hardware secure elements.

Discussion

Computing systems such as personal computers may run a host operating system (OS) that can be vulnerable to attacks by malware (malicious software). To improve security, a dedicated hardware element (e.g., a "secure element") may be incorporated into the computing system, wherein the element may boot securely, running only trusted firmware in a hardware environment that is isolated from the OS and other host based software. The secure element may therefore be used to implement security and manageability features in a trusted fashion.

For some usage scenarios, the secure element may interact with other hardware devices on the system. In these cases, therefore, there may be a potential risk of malware compromising the other hardware devices and/or tampering with the communication channel between the secure element and the other hardware devices. In some instances, the communication channel between the secure element and another hardware device may flow through the host OS.

Indeed, many input output (IO) devices, such as a keyboard, mouse, touch screen, printer, etc., may be connected to the system through a USB (Universal Serial Bus, e.g., USB Specification 3.0, Rev. 1.0, Nov. 12, 2008, USB Implementers Forum) or other similar interface. Because of hardware limitations, these USB devices may be directly accessible only by host software such as the OS or BIOS (basic input output system, UEFI/unified extensible firmware interface, etc.), through USB controllers. Accordingly, while the use of dedicated hardware secure elements may be suitable under certain circumstances, there remains considerable room for improvement with regard to IO devices.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
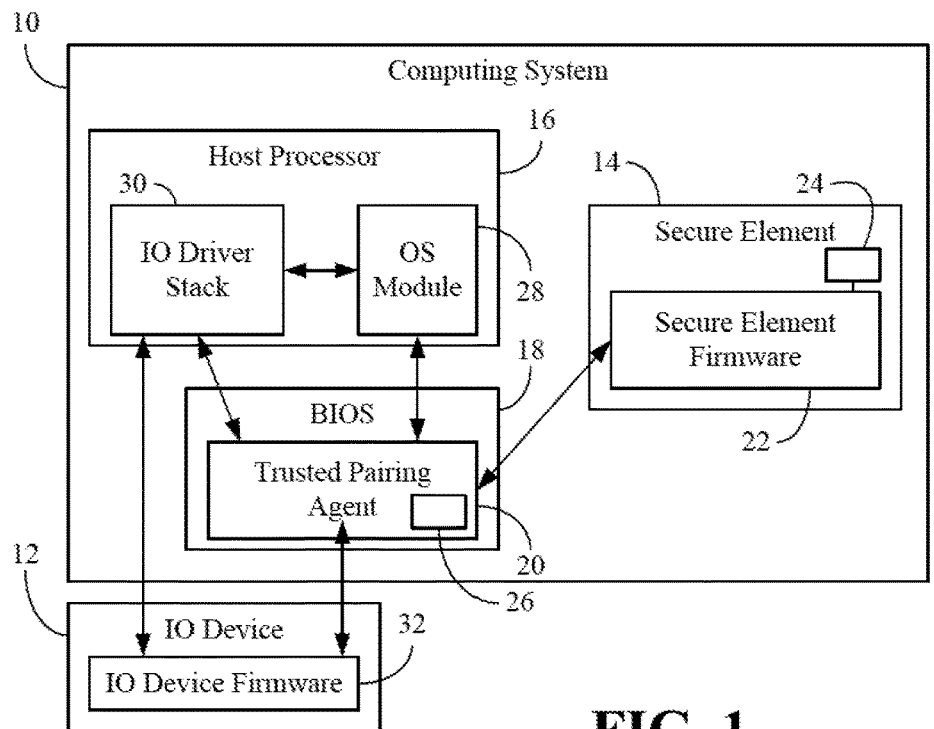
FIG. 1 is a block diagram of an example of a computing architecture according to an embodiment.

FIG. 1 shows a computing architecture in which an input output (IO) device 12 is coupled to a computing system 10. The computing system 10 may include, for example, a server, workstation, desktop computer, notebook computer, tablet computer, convertible tablet, personal digital assistant (PDA), mobile Internet device (MID), smart phone, media player, and so forth. Additionally, the IO device 12 may include, for example, a keyboard, mouse, touch screen, printer, etc., that may be used to communicate sensitive, private and/or personal information such as, for example, login, account and/or financial information associated with a wide variety of applications (e.g., banking, e-commerce, social networking, etc.).

In one example, the IO device 12 is a USB device, although other bus configurations and/or technologies may also be used. Thus, the IO device 12 may be a discrete device that is directly accessible only by software running on either a host processor 16 (e.g., central processing unit/CPU) or a BIOS 18 (basic input output system, and/or UEFI) of the computing system 10. Accordingly, communications between the computing system 10 and the IO device 12 may be subject to attacks by host-based malware. As will be discussed in greater detail, the computing system 10 may be configured to automatically pair the IO device 12 with a hardware-based secure element 14 upon connection of the IO device 12 to the computing system 10 so that malware concerns (e.g., spoofing, key logging) may be obviated with regard to communications between the IO device 12 and the secure element 14.

In general, the secure element 14 may establish a trusted channel/relationship with a trusted pairing agent 20 in the BIOS 18 during an early boot stage of the computing system 10, and leverage that trusted channel to establish an additional trusted channel with the IO device 12 when the IO device 12 is coupled to the computing system 10. More particularly, the illustrated trusted pairing agent 20 may generate a random pairing authentication value (PAV) and store the PAV to a hidden memory space 26. In one example, the trusted pairing agent 20 is a system management interrupt (SMI) handler and the hidden memory space 26 is located in system management random access memory (SMRAM) that is isolated from code running outside of system management mode (SMM). Thus, the execution environment of the illustrated trusted pairing agent 20 cannot be preempted by other system software. In another example, the trusted pairing agent 20 is an authenticated code module (ACM) that also has its own memory space (e.g., AC-RAM) and execution environment that is isolated and hidden from untrusted code.

The trusted pairing agent 20 may also send, during a boot process (e.g., power on self test/POST, transition into the S0 ACPI/Advanced Configuration and Power Interface, e.g., ACPI Specification, Rev. 5.0a, Dec. 6, 2011 state, etc.), the pairing authentication value to the secure element 14. Transmission of the pairing authentication value may be configured to occur relatively early in the boot process (e.g., prior to a predetermined BIOS stage such as, for example, execution of third party code, or firmware in option read only memory/ROM for BIOS) to ensure that malware is not given the opportunity to spoof or otherwise tamper with the pairing authentication value. Additionally, the secure element 14 may include firmware 22 that receives the pairing authentication value and accepts the pairing authentication value only if it was received prior to the predetermined BIOS stage. Acceptance of the pairing authentication value may involve storing the pairing authentication value to local memory 24 (e.g., trusted and secure) of the secure element 14. Rejection of the pairing authentication value may involve, for example, throttling requests, rejecting future requests, resetting the computing system, and/or other implementation specific behavior. The pairing authentication value may generally be used in subsequent communications between the trusted pairing agent 20 and the secure element 14 in order to maintain the trusted nature of the relationship between those components.

When the IO device 12 is coupled (e.g., connected, plugged into, registered with) the computing system 10, an IO driver stack 30 running on the host processor 16 may communicate with firmware 32 running on the IO device 12 to detect the presence of the IO device 12. Additionally, an OS module 28 (e.g., host pairing requestor) running on the host processor 16 may obtain a device address for the IO device 12 from the IO driver stack 30 and issue a pairing request to the trusted pairing agent 20, wherein the pairing request may include the device address of the IO device 12. In response to receiving the pairing request, the trusted pairing agent 20 may generate a random pairing key (e.g., random or pseudo-random 128 bit number)

The trusted pairing agent 20 may also send a message to the secure element 14 that includes the pairing key, the previously generated pairing authentication value and the address of the IO device 12. The secure element 14 may in turn validate the pairing authentication value contained in the message against the pairing authentication value received earlier during the boot process. If a match is found, the illustrated secure element 14 uses the pairing key and the address to establish a secure channel with the IO device 12.

Figure 2:
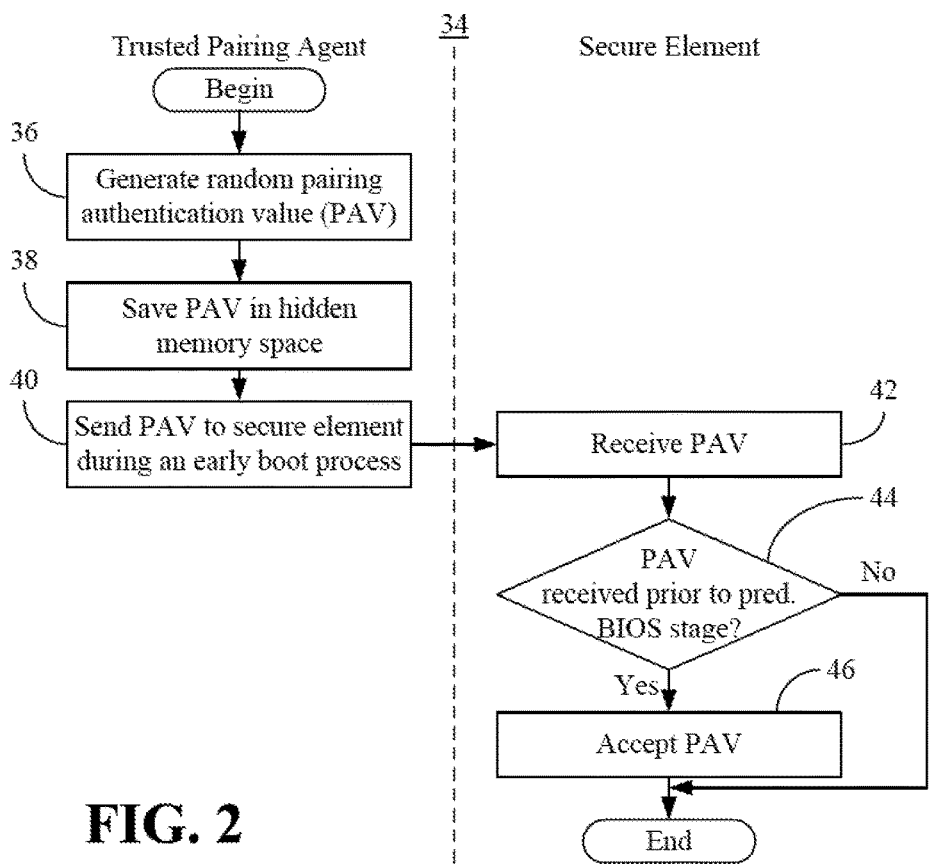
FIG. 2 is a flowchart of an example of a method of establishing a trusted channel between a trusted pairing agent and a secure element according to an embodiment.

FIG. 2 shows a method 34 of establishing a trusted channel between a pairing agent and a secure element. The method 34 may be implemented as a set of tamper-proof logic and/or firmware instructions stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 34 may be written in any combination of one or more programming languages, including an object oriented programming language such as Java, Smalltalk, C++ or the like and conventional procedural programming languages, such as the "C" programming language or similar programming languages. In one example, the method is implemented in a trusted pairing agent such as, for example, the trusted pairing agent 20 (FIG. 1) and/or secure element firmware such as, for example, the secure element firmware 22 (FIG. 1), already discussed.

Illustrated agent block 36 provides for generating a random pairing authentication value (PAV), wherein the PAV may be saved in a hidden memory space at block 38. As already noted, the hidden memory space may be isolated from code running outside of SMM. Block 40 may send the PAV to a secure element of the computing system during an early boot process of the system. For example, the PAV may be sent to the secure element in conjunction with a POST, a transition from the S5/S4/S3 states into the S0 ACPI state, and so forth. Additionally, secure element block 42 may receive the PAV, wherein a determination may be made at secure element block 44 as to whether the PAV was received prior to a predetermined stage of the boot process (e.g., before execution of third party code). Block 44 may take into consideration various markers and/or checkpoints in the BIOS/UEFI to which the secure element has access. If the PAV was received prior to the predetermined stage, the PAV may be accepted at secure element block 46. Otherwise, acceptance of the PAV may be bypassed (e.g., the secure element ignores the PAV). If the PAV is not accepted, other responses may be implemented such as, for example, throttling requests, rejecting future requests, resetting the computing system, and/or other implementation specific behavior.

Figure 3:
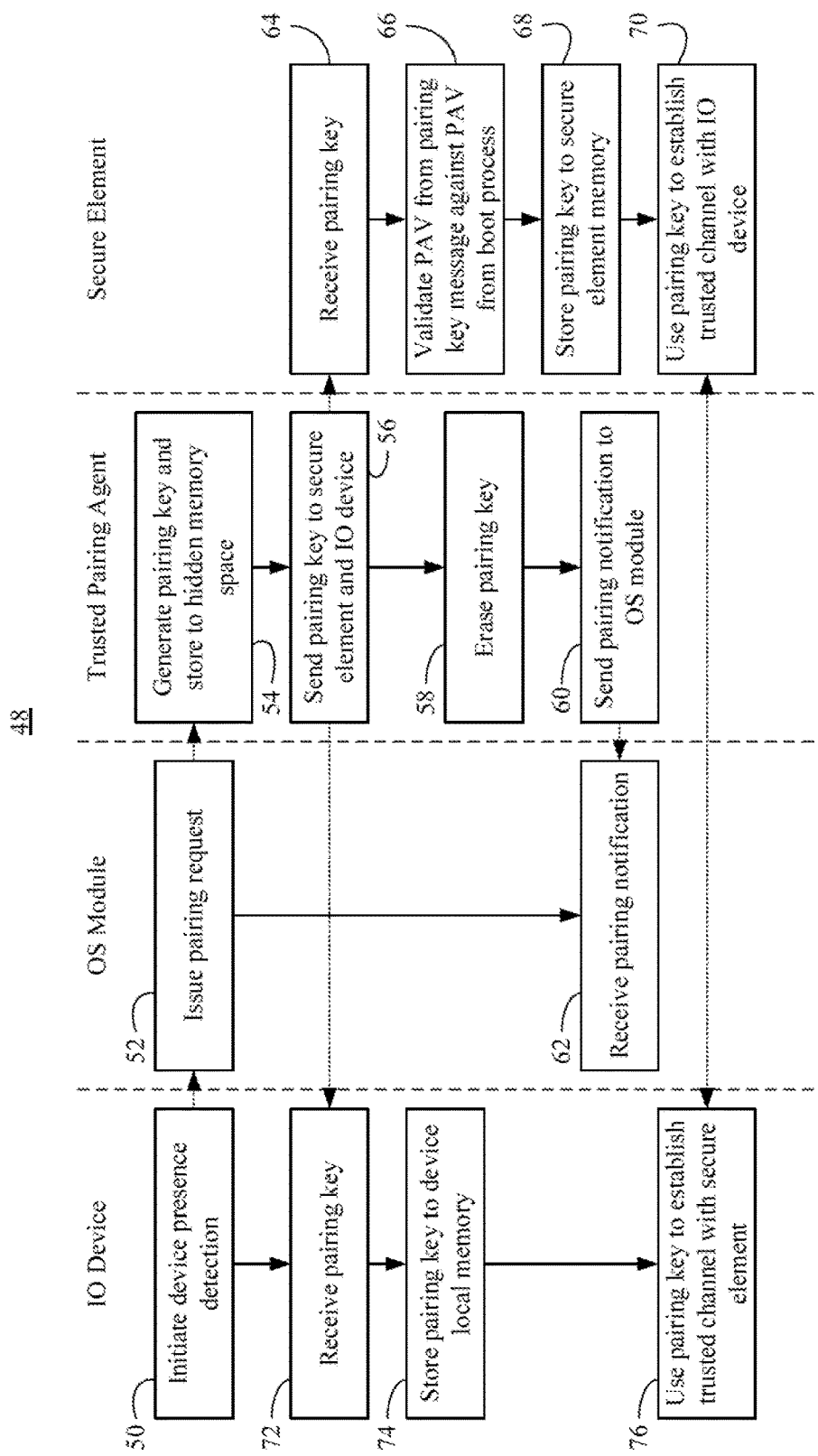
FIG. 3 is a flowchart of an example of a method of establishing a trusted channel between a secure element and an input output (IO) device according to an embodiment.

FIG. 3 shows a method 48 of establishing a trusted channel between a secure element and an IO device. The method 48 may be implemented as a set of logic and/or firmware instructions stored in a machine- or computer-readable storage medium such as RAM, ROM, PROM, flash memory, etc., in configurable logic such as, for example, PLAs, FPGAs, CPLDs, in fixed functionality logic hardware using circuit technology such as, for example, ASIC, CMOS or TTL technology, or any combination thereof. For example, computer program code to carry out operations shown in the method 48 may be written in any combination of one or more programming languages, including an object oriented programming language such as Java, Smalltalk, C++ or the like and conventional procedural programming languages, such as the "C" programming language or similar programming languages.

In one example, the method 48 is implemented in an IO device such as, for example, the IO device 12 (FIG. 1), an OS module such as, for example, the OS module 28 (FIG. 1), a trusted pairing agent such as, for example, the trusted pairing agent 20 (FIG. 1) and/or secure element firmware such as, for example, the secure element firmware 22 (FIG. 1), already discussed. The IO device may communicate with the computing system via a USB, PCI-e (Peripheral Components Interconnect Express, e.g., PCI Express x16 Graphics 150W-ATX Specification 1.0, PCI Special Interest Group), Firewire (e.g., Institute of Electrical and Electronics Engineers/IEEE Standard for a High-Performance Serial Bus, 1394-2008, Oct. 21, 2008), Bluetooth link (e.g., IEEE 802.15.1-2005, Wireless Personal Area Networks), and so forth.

Illustrated IO device block 50 provides for initiating a device presence detection, wherein OS module block 52 may issue a pairing request to a trusted pairing agent in response to the initiation of the device presence detection. Upon receiving the pairing request, agent block 54 may generate a pairing key and store the pairing key to a hidden memory space. The pairing key may be sent to a secure element at block 56 in a message that also includes the PAV and the address of the IO device. Block 56 may also provide for sending the pairing key to the IO device that initiated the device presence detection. Illustrated agent block 58 erases the pairing key from the hidden memory space, wherein a pairing notification may be sent at agent block 60 to the OS module. The OS module may receive the pairing notification at block 62.

The pairing key may be received by the secure element at secure element block 64. In one example, the PAV from the pairing key message (e.g., the "second" pairing authentication value) is validated at block 66 against the PAV from the boot process (e.g., the "first" pairing authentication value). If validation is successful, block 68 may store the pairing key to private memory of the secure element. Additionally, the pairing key may be used at block 70 to establish a trusted channel with the IO device.

The pairing key may also be received by the IO device at device block 72, wherein illustrated device block 74 provides for storing the pairing key to local memory of the IO device. Device block 76 may use the pairing key to establish a trusted channel with the secure element. In particular, establishment of the trusted channel at blocks 70 and 76 may involve, for example, deriving shared encryption and signing keys to establish an end-to-end trusted channel (tunnel)

through the host driver stack. Thus, OS software running on the host processor may be responsible for forwarding messages between the IO device and the secure element firmware for secure channel establishment and secure communication through the channel. The host OS software, however, may not be aware of the pairing key. Thus, the host may be unable to tamper with the data stream between the IO device and the secure element, in the example shown.

Additional Notes and Examples

Example 1 may include a system to pair devices, comprising an IO device and a secure element to receive, during a boot process of the system, a first pairing authentication value, receive a pairing key and use the first pairing authentication value and the pairing key to establish a trusted channel between the secure element and the IO device. The system may also comprise a pairing agent to send, during the boot process, the first pairing authentication value to the secure element, generate the pairing key in response to a pairing request with the IO device and send the pairing key to the secure element and the IO device.

Example 2 may include the system of Example 1, wherein the secure element is to accept the first pairing authentication value only if the first pairing authentication value is received prior to a predetermined stage of the boot process.

Example 3 may include the system of Example 1, wherein the secure element is to identify a second pairing authentication value in a message that also includes the pairing key, and validate the second pairing authentication value against the first pairing authentication value to establish the trusted channel.

Example 4 may include the system of Example 1, further including an operating system (OS) module to issue the pairing request, wherein the pairing agent is to send a pairing notification to the OS module.

Example 5 may include the system of Example 1, further including a hidden memory space that is isolated from code running outside of system management mode, wherein the pairing agent is to store the pairing key to the hidden memory space, and wherein the pairing key is to include the first pairing authentication value and an IO device address, and erase the pairing key from the hidden memory space after the pairing key is sent to the secure element and the IO device.

Example 6 may include the system of any one of Examples 1 to 5, wherein the pairing agent is one of a system management interrupt (SMI) handler or an authenticated code module (ACM), and the IO device is a Universal Serial Bus (USB) device.

Example 7 may include a method, implemented at least partly in fixed functionality hardware, of operating a pairing agent, comprising sending, during a boot process of a system, a pairing authorization value from the pairing agent to a secure element of the system, generating a pairing key in response to a pairing request associated with an IO device coupled to the system, and sending the pairing key to the secure element and the IO device.

Example 8 may include the method of Example 7, wherein the pairing agent is one of a system management interrupt (SMI) handler or an authenticated code module (ACM).

Example 9 may include the method of Example 7, further including receiving the pairing request from an operating system (OS) module.

Example 10 may include the method of Example 9, further including sending a pairing notification to the OS module.

Example 11 may include the method of Example 7, further including storing the pairing key to a hidden memory space that is isolated from code running outside of system management mode, wherein the pairing key is sent in a message that also includes the pairing authentication value and an IO device address, and erasing the pairing key from the hidden memory space after the pairing key is sent to the secure element and the IO device.

Example 12 may include the method of any one of Examples 7 to 11, wherein sending the pairing key to the IO device includes sending the pairing key to a Universal Serial Bus (USB) device.

Example 13 may include a method, implemented at least partly in fixed functionality hardware, of operating a secure element, comprising receiving, during a boot process of a system, a first pairing authentication value from a pairing agent of the system, receiving a pairing key from the pairing agent and using the first pairing authentication value and the pairing key to establish a trusted channel between the secure element and an IO device coupled to the system.

Example 14 may include the method of Example 13, further including accepting the first pairing authentication value only if the first pairing authentication value is received prior to a predetermined stage of the boot process.

Example 15 may include the method of Example 13, wherein using the first pairing authentication value to establish the trusted channel includes identifying a second pairing authentication value in a message that also includes the pairing key, and validating the second pairing authentication value against the first pairing authentication value.

Example 16 may include the method of Example 13, wherein the first pairing authentication value and the pairing key are received from one of a system management interrupt (SMI) handler or an authenticated code module (ACM).

Example 17 may include the method of Example 13, further including identifying an IO device address in a message that also includes the pairing key.

Example 18 may include the method of any one of Examples 13 to 17, wherein the trusted channel is established between the secure element and a Universal Serial Bus (USB) device.

Example 19 may include at least one computer readable storage medium comprising a set of instructions which, if executed by a secure element of a system, cause the secure element to receive, during a boot process of the system, a first pairing authentication value from a pairing agent of the system, receive a pairing key from the pairing agent and use the first pairing authentication value and the pairing key to establish a trusted channel between the secure element and an IO device coupled to the system.

Example 20 may include the at least one computer readable storage medium of Example 19, wherein the instructions, if executed, cause the secure element to accept the first pairing authentication value only if the first pairing authentication value is received prior to a predetermined stage of the boot process.

Example 21 may include the at least one computer readable storage medium of Example 19, wherein the instructions, if executed, cause the secure element to identify a second pairing authentication value in a message that also includes the pairing key, and validate the second pairing authentication value against the first pairing authentication value to establish the trusted channel.

Example 22 may include the at least one computer readable storage medium of Example 19, wherein the first pairing authentication value and the pairing key are to be received from one of a system management interrupt (SMI) handler or an authenticated code module (ACM).

Example 23 may include the at least one computer readable storage medium of Example 19, wherein the instructions, if executed, cause the secure element to identify an IO device address in a message that also includes the pairing key.

Example 24 may include the at least one computer readable storage medium of any one of Examples 19 to 23, wherein the trusted channel is to be established between the secure element and a Universal Serial Bus (USB) device.

Example 25 may include an apparatus to operate a pairing agent, comprising an IO device interface including the pairing agent to send, during the boot process, a pairing authorization value from the pairing agent to a secure element of a system, generate a pairing key in response to a pairing request associated with an IO device coupled to the system and send the pairing key to the secure element and the IO device.

Example 26 may include the apparatus of Example 25, wherein the pairing agent is one of a system management interrupt (SMI) handler or an authenticated code module (ACM).

Example 27 may include the apparatus of Example 25, wherein the pairing agent is to receive the pairing request from an operating system (OS) module.

Example 28 may include the apparatus of Example 27, wherein the pairing agent is to send a pairing notification to the OS module.

Example 29 may include the apparatus of Example 25, wherein the pairing agent is to store the pairing key to a hidden memory space that is isolated from code running outside of system management mode, wherein the pairing key is to be sent in a message that also includes the pairing authentication value and an IO device address, and erase the pairing key from the hidden memory space after the pairing key is sent to the secure element and the IO device.

Example 30 may include an apparatus to operate a pairing agent, comprising means for performing the method of any one of Examples 7 to 11.

Example 31 may include at least one computer readable storage medium comprising a set of instructions which, if executed by a pairing agent, cause the pairing agent to perform the method of any one of Examples 7 to 11.

Example 32 may include an apparatus to operate a secure element, comprising means for performing the method of any one of Examples 13 to 17.

Thus, techniques described herein may enable IO devices such as Bluetooth, USB, PCI-e and/or Firewire devices to be automatically paired with secure elements of a computing system. Thus, whenever a system boots or resumes operation of a host OS, all connected IO devices that support pairing may be automatically paired with the secure element. Moreover, while a host OS is in execution and an IO hot plug event occurs, the IO device in question may also be automatically paired with the secure element (if pairing is supported). Pairings may last until the paired IO device is powered off or unplugged, or until the host OS exits from the active state (e.g., suspends, hibernates or turns off). Once pairing has been completed, the host OS (and any potential malware) may be prevented from deciphering, modifying or replaying the contents of the data flowing between the secure element and the IO device. Refusal of the host OS to forward the traffic appropriately may merely result in denial of service. Thus, concerns over host-based malware may be greatly obviated under the techniques described herein.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) evolve over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A system comprising:
an input output (IO) device;
a secure element to,
  receive, during a boot process of the system, a first pairing authentication value,
  determine whether the first pairing authentication value is received by the secure element prior to a stage of the boot process in which execution of third party code occurs,
  determine whether to bypass the first pairing authentication value, wherein the first pairing authentication value is to be bypassed by the secure element when the first pairing authentication value is received by the secure element at a time that is not prior to the stage,
  receive a pairing key, and
  use the first pairing authentication value and the pairing key to establish a trusted channel between the secure element and the IO device, wherein to establish the trusted channel, the secure element is to derive, from the pairing key, one or more of a shared encryption or a signing key that is used to pass messages between the secure element and the IO device through a host operating system software that forwards the messages; and a pairing agent to,
  send, during the boot process and prior to the stage of the boot process, the first pairing authentication value to the secure element,
  generate the pairing key in response to a pairing request associated with the IO device,
  send the pairing key to the secure element and the IO device, and
  erase the pairing key after the pairing key is sent to the secure element and the IO device so that the host operating system software is unaware of the pairing key.

2. The system of claim 1, wherein the secure element is to:
identify a second pairing authentication value in a message that also includes the pairing key, and
validate the second pairing authentication value against the first pairing authentication value to establish the trusted channel.

3. The system of claim 1, further including an operating system (OS) module to issue the pairing request, wherein the pairing agent is to send a pairing notification to the OS module.

4. The system of claim 1, further including a hidden memory space that is isolated from code running outside of system management mode, wherein the pairing agent is to:
store the pairing key to the hidden memory space, and wherein the pairing key is sent in a message that also includes the first pairing authentication value and an IO device address, and
erase the pairing key from the hidden memory space after the pairing key is sent to the secure element and the IO device.

5. The system of claim 1, wherein the pairing agent is one of a system management interrupt (SMI) handler or an authenticated code module (ACM), and the IO device is a Universal Serial Bus (USB) device.

6. A method, implemented at least partly in fixed functionality hardware, of operating a pairing agent, comprising:

sending, during a boot process of a system, a pairing authentication value from the pairing agent to a secure element of the system, wherein the pairing authentication value is to be sent prior to a stage of the boot process in which execution of third party code occurs;
generating a pairing key in response to a pairing request associated with an input output (IO) device coupled to the system, wherein the pairing key is to be used to derive one or more of a shared encryption or a signing key that is used to pass messages between the secure element and the IO device through a host operating system software that forwards the messages;
sending the pairing key to the secure element and the IO device; and
erase, at the pairing agent, the pairing key after the pairing key is sent to the secure element and the IO device so that the host operating system software is unaware of the pairing key.

7. The method of claim 6, wherein the pairing agent is one of a system management interrupt (SMI) handler or an authenticated code module (ACM).

8. The method of claim 6, further including receiving the pairing request from an operating system (OS) module.

9. The method of claim 8, further including sending a pairing notification to the OS module.

10. The method of claim 6, further including:
storing the pairing key to a hidden memory space that is isolated from code running outside of system management mode, wherein the pairing key is sent in a message that also includes the pairing authentication value and an IO device address; and
erasing the pairing key from the hidden memory space after the pairing key is sent to the secure element and the IO device.

11. The method of claim 6, wherein sending the pairing key to the IO device includes sending the pairing key to a Universal Serial Bus (USB) device.

12. A method, implemented at least partly in fixed functionality hardware, of operating a secure element, comprising:
receiving, during a boot process of a system, a first pairing authentication value from a pairing agent of the system;
receiving a pairing key from the pairing agent;
determining whether the first pairing authentication value is received by the secure element prior to a stage of the boot process in which execution of third party code occurs;
determining whether to bypass the first pairing authentication value, wherein the first pairing authentication value is to be bypassed by the secure element when the first pairing authentication value is received by the secure element at a time that is not prior to the stage; and
when the first pairing authentication value is not bypassed, using the first pairing authentication value and the pairing key to establish a trusted channel between the secure element and an input output (IO) device coupled to the system,
wherein to establish the trusted channel, the secure element is to derive, from the pairing key, one or more of a shared encryption or a signing key that is used to pass messages between the secure element and the IO device through a host operating system software that is unaware of the pairing key and forwards the messages.

13. The method of claim 12, wherein using the first pairing authentication value to establish the trusted channel includes:

identifying a second pairing authentication value in a message that also includes the pairing key; and
validating the second pairing authentication value against the first pairing authentication value.

14. The method of claim 12, wherein the first pairing authentication value and the pairing key are received from one of a system management interrupt (SMI) handler or an authenticated code module (ACM).

15. The method of claim 12, further including identifying an IO device address in a message that also includes the pairing key.

16. The method of claim 12, wherein the trusted channel is established between the secure element and a Universal Serial Bus (USB) device.

17. At least one non-transitory computer readable storage medium comprising a set of instructions which, if executed by a secure element of a system, cause the secure element to:
receive, during a boot process of the system, a first pairing authentication value from a pairing agent of the system;
determine whether the first pairing authentication value is received by the secure element prior to a stage of the boot process in which execution of third party code occurs;
determine whether to bypass the first pairing authentication value, wherein the first pairing authentication value is to be bypassed by the secure element when the first pairing authentication value is received by the secure element at a time that is not prior to the stage; and
receive a pairing key from the pairing agent; and
when the first pairing authentication value is not bypassed, use the first pairing authentication value and the pairing key to establish a trusted channel between the secure element and an input output (IO) device coupled to the system,
wherein to establish the trusted channel, the set of instructions which, if executed by the secure element, cause the secure element to derive, from the pairing key, one or more of a shared encryption or a signing key that is used to pass messages between the secure element and the IO device through a host operating system software that is unaware of the pairing key and forwards the messages.

18. The at least one non-transitory computer readable storage medium of claim 17, wherein the instructions, if executed, cause the secure element to:
identify a second pairing authentication value in a message that also includes the pairing key; and
validate the second pairing authentication value against the first pairing authentication value to establish the trusted channel.

19. The at least one non-transitory computer readable storage medium of claim 17, wherein the first pairing authentication value and the pairing key are to be received from one of a system management interrupt (SMI) handler or an authenticated code module (ACM).

20. The at least one non-transitory computer readable storage medium of claim 17, wherein the instructions, if executed, cause the secure element to identify an IO device address in a message that also includes the pairing key.

21. The at least one non-transitory computer readable storage medium of claim 17, wherein the trusted channel is to be established between the secure element and a Universal Serial Bus (USB) device.

22. The system of claim 1, wherein the secure element is to:
receive a first message, prior to the stage of the boot process, that includes the first pairing authentication value;
after the first message is received, receive a second message that includes the pairing key and the first pairing authentication value; and
confirm that the first pairing authentication value of the second message is the same as the first pairing authentication value of the first message to determine that the pairing key is to be accepted by the secure element.

23. The system of claim 1, wherein to establish the trusted channel, the secure element is to derive, from the pairing key, the shared encryption to pass each of the messages between the secure element and the IO device.

24. The system of claim 1, wherein the host operating system software is unaware of the pairing key so as to be unable to tamper with the messages that the host operating system software passes between the secure element and the IO device.

* * * * *